United States Patent
Rehman

(10) Patent No.: US 8,099,737 B2
(45) Date of Patent: Jan. 17, 2012

(54) EVENT PROCESSING FINITE STATE ENGINE AND LANGUAGE

(75) Inventor: Samuelson Rehman, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 1035 days.

(21) Appl. No.: 11/758,527

(22) Filed: Jun. 5, 2007

(65) Prior Publication Data

US 2008/0307435 A1 Dec. 11, 2008

(51) Int. Cl.
*G06F 3/00* (2006.01)
*G05B 11/01* (2006.01)
*G08C 19/12* (2006.01)

(52) U.S. Cl. .................. 719/318; 340/12.51; 340/13.26

(58) Field of Classification Search .................. None
See application file for complete search history.

(56) References Cited

U.S. PATENT DOCUMENTS

| | | | | |
|---|---|---|---|---|
| 2004/0093479 | A1* | 5/2004 | Ramchandran | 712/210 |
| 2006/0184980 | A1* | 8/2006 | Cole | 725/88 |
| 2007/0260428 | A1* | 11/2007 | Anderson et al. | 702/186 |

* cited by examiner

*Primary Examiner* — Andy Ho
*Assistant Examiner* — Tuan Dao
(74) *Attorney, Agent, or Firm* — Kilpatrick Townsend & Stockton LLP

(57) ABSTRACT

In various embodiments, a method for processing event streams includes receiving a finite state machine defined in response to a set of processing components, a set of states, and a set of entry points. Event data associated with an event stream is also received. The event data is processes according to the finite state machine to generate an event.

18 Claims, 11 Drawing Sheets

```
<eflow>                                    ~1010
  <components>~1020
    <component name="addContext" class="\\class_path\.AddContextState"/>
    <component name="callBean" class="\\class_path\.CallBeanState"/>
    <component name="dbproc" class="\\class_path\.DbProcState"/>
    <component name="fireTrigger" class="\\class_path\.FireTriggerState"/>      ~1050
    <component name="matchEvent" class="\\class_path\.MatchEventState"/>
    <component name="post" class="\\class_path\.PostState"/>
    <component name="sendEvent" class="\\class_path\.SendEventState"/>
    <component name="template" class="\\class_path\.TemplateState"/>
    <component name="transport" class="\\class_path\.TransportState"/>
    <component name="callWs" class="\\class_path\.WsState"/>
    <component name="decodeTag" class="\\class_path\.DecodeState"/>
    <component name="encodeTag" class="\\class_path\.EncodeState"/>
    <component name="isCapture" class="\\class_path\.IsCaptureState"/>
    <component name="isQuery" class="\\class_path\.IsSimpleQueryState"/>
  </components>
  <entry>~1030
    <onEvent state='A.check'/>~1060
  </entry>

<states>~1040
    ...
    <matchEvent name="A.check" control="matchEvent" type="200" x="100" y="200">~1070
      <case result="ok" next="rfid.event"/>~1080
    </matchEvent>

<matchEvent name="rfid.event" control="matchEvent" type="200" id="000000000001" x="100" y="200">
      <case result="ok" next="callbean.event"/>
      <case result="notFound" next="bad.event"/>
    </matchEvent>
    ...
  </states>
</eflow>
```

FIG. 10

EVENT PROCESSING FINITE STATE ENGINE AND LANGUAGE

CROSS-REFERENCES TO RELATED APPLICATIONS

The present disclosure may be related to the following commonly assigned applications/patents:

This application is related to co-pending U.S. patent application Ser. No. 11/685,655 filed Mar. 13, 2007 and entitled "Virtualization and Quality of Data;"

This application is related to co-pending U.S. patent application Ser. No. 11/685,673 filed Mar. 13, 2007 and entitled "Real-Time and Offline Location Tracking Using Passive RFID Technologies;"

This application is related to co-pending U.S. patent application Ser. No. 11/758,538, filed Jun. 5, 2007 and entitled "RFID Key Rotation System;"

This application is related to co-pending U.S. patent application Ser. No. 11/758,532, filed Jun. 5, 2007 and entitled "RFID and Sensor Signing System;" and This application is related to co-pending U.S. patent application Ser. No. 11/871,829, filed Oct. 12, 2007 and entitled "Industrial Identify Encoding and Decoding Language," the respective disclosures of these applications/patents are incorporated herein by reference in their entirety for all purposes.

BACKGROUND OF THE INVENTION

Embodiments of the present invention generally relate to Radio Frequency Identification (RFID) applications. More specifically, embodiments of the present invention relate to techniques for processing events using a finite state engine.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Moreover, in order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. Accordingly, with the addition of each sensor device, a specific application may be required to access the sensor data from the sensor device. This vendor lock-in leads to having too many non-integrated applications, creates unnecessary complexity, and also increases costs associated with the management and deployment of RFID technologies.

One solution is to embed the sensor device with the RFID tag. For example, one cold chain solution provides an RFID tag embedded with a temperature sensor. Cold chain refers to a temperature-controlled supply chain. An unbroken cold chain is an uninterrupted series of storage and distribution activities which maintain a given temperature range. A reader can read both the identifier of the RFID as well as the temperature from the embedded sensor.

However, by embedding sensors with RFID tags, the cost, and complexity associated with each RFID tag increase. Furthermore, computer applications configured to read the sensor data are still tied directly to specific RFID readers. Thus, the only items for which sensor data can be used from those applications are still those that can be tagged and directly sensed using the specific vendor supplied RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques for processing events using a finite state engine.

In various embodiments, a method for processing event streams includes receiving a finite state machine defined in response to a set of processing components, a set of states, and a set of entry points. Event data associated with an event stream is also received. The event data is processes according to the finite state machine to generate an event.

In some embodiments, the set of processing components may be received. Each of the processing components may include one or more operations. The one or more operations may include at least one of a logical operation, an arithmetic operation, a binary operation, and a compare operation. In one embodiment, the set of states is received. Each of the states may identify one or more relationships between a first processing component and a second processing component.

In various embodiments, the set of entry points is received. Each entry point may identify one or more states as start states associated with the finite state machine. The finite state machine may be generated based on the set of processing components, the set of states, and the set of entry points.

In some embodiments, a system for processing event streams includes a processor and a memory. The memory is coupled to the processor and configured to store a plurality of code modules which when executed by the processor cause the processor to receive a finite state machine defined in response to a set of processing components, a set of states, and a set of entry points, receive event data associated with an event stream, and process the event data according to the finite state machine to generate an event.

In further embodiments, a computer program product is stored on a computer readable medium for processing event streams. The computer program product includes code for receiving a finite state machine defined in response to a set of processing components, a set of states, and a set of entry points, code for receiving event data associated with an event stream, and code for processing the event data according to the finite state machine to generate an event.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 10 represents one example of a specification for generating a finite state machine in response to a set of processing components, a set of states, and a set of entry points in one embodiment according to the present invention.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
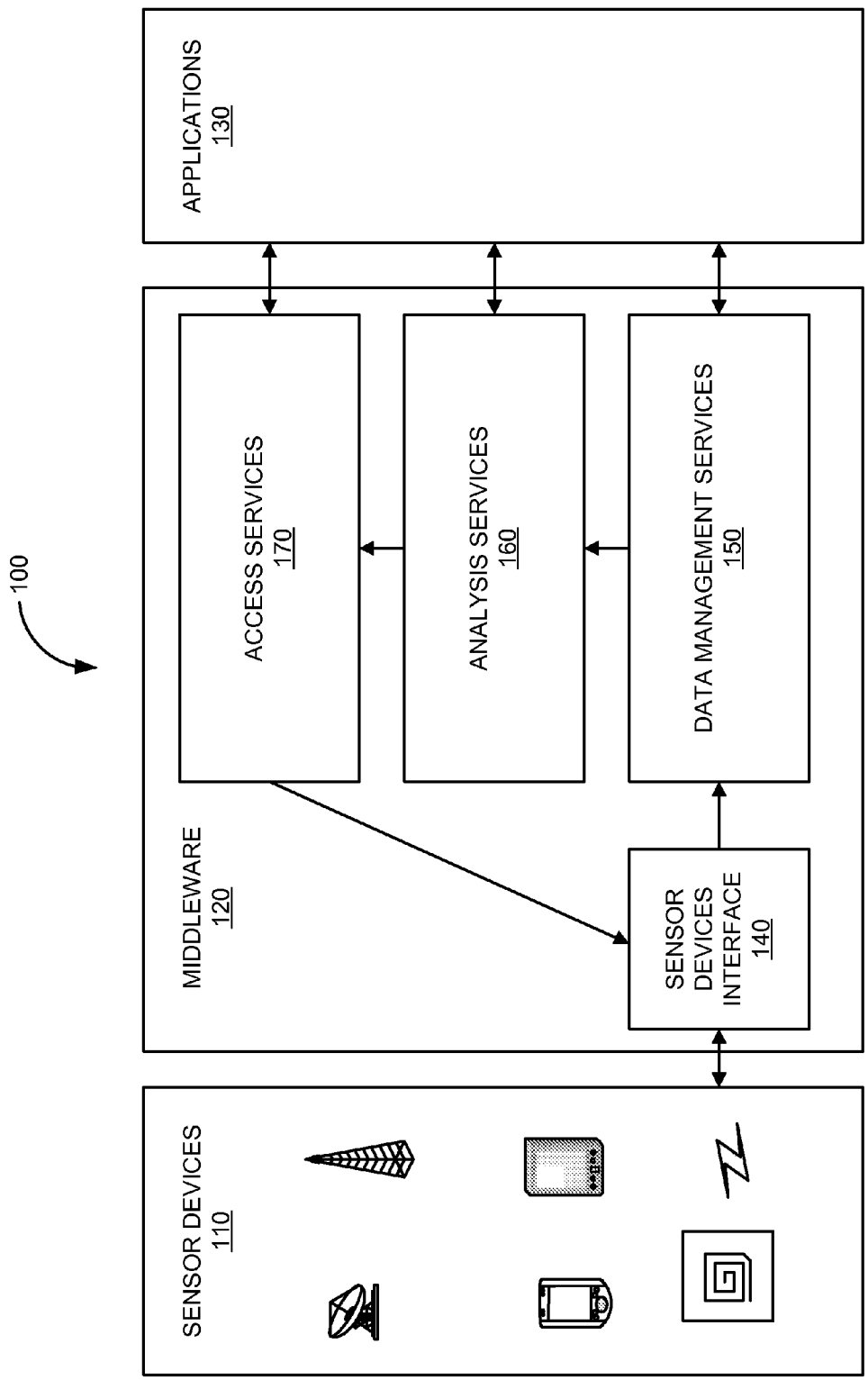
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
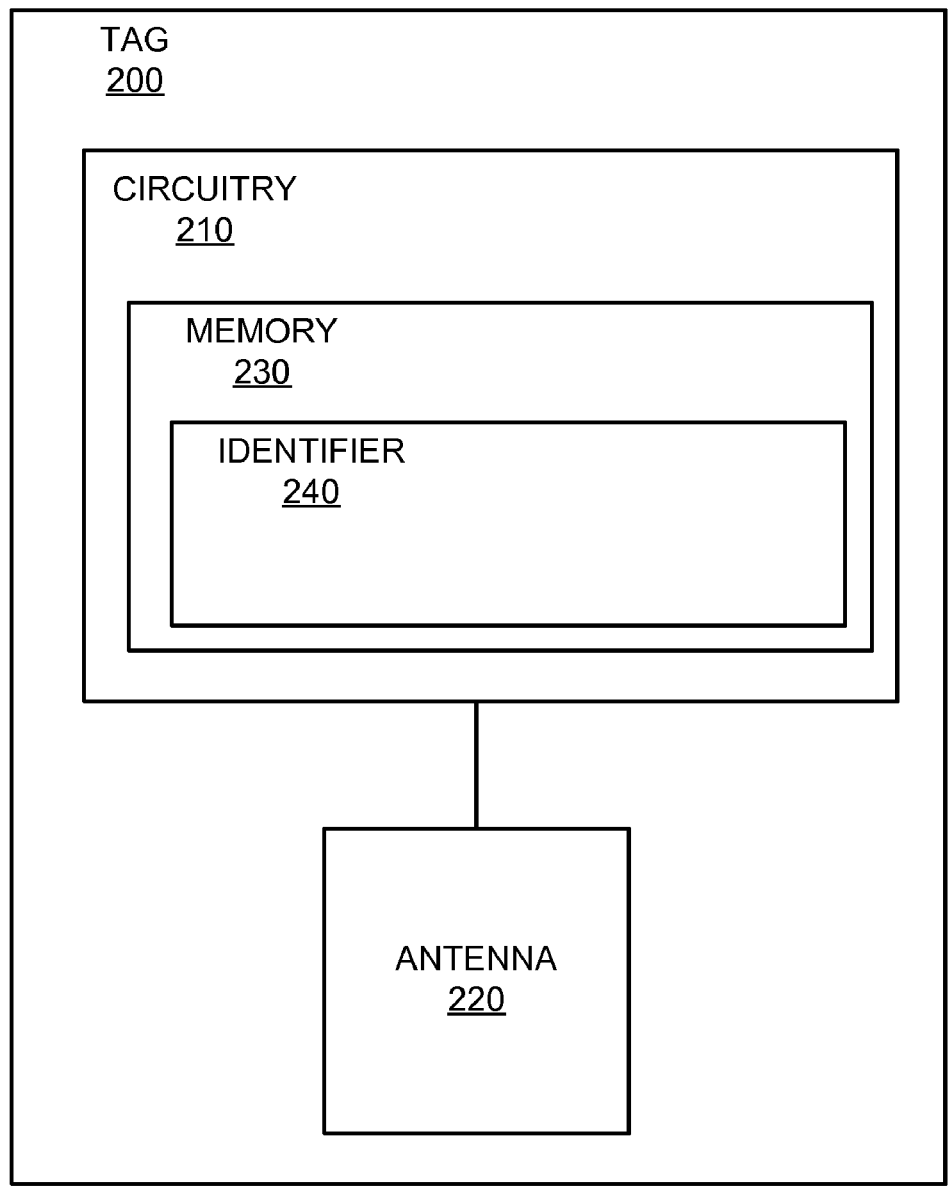
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPCglobal, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
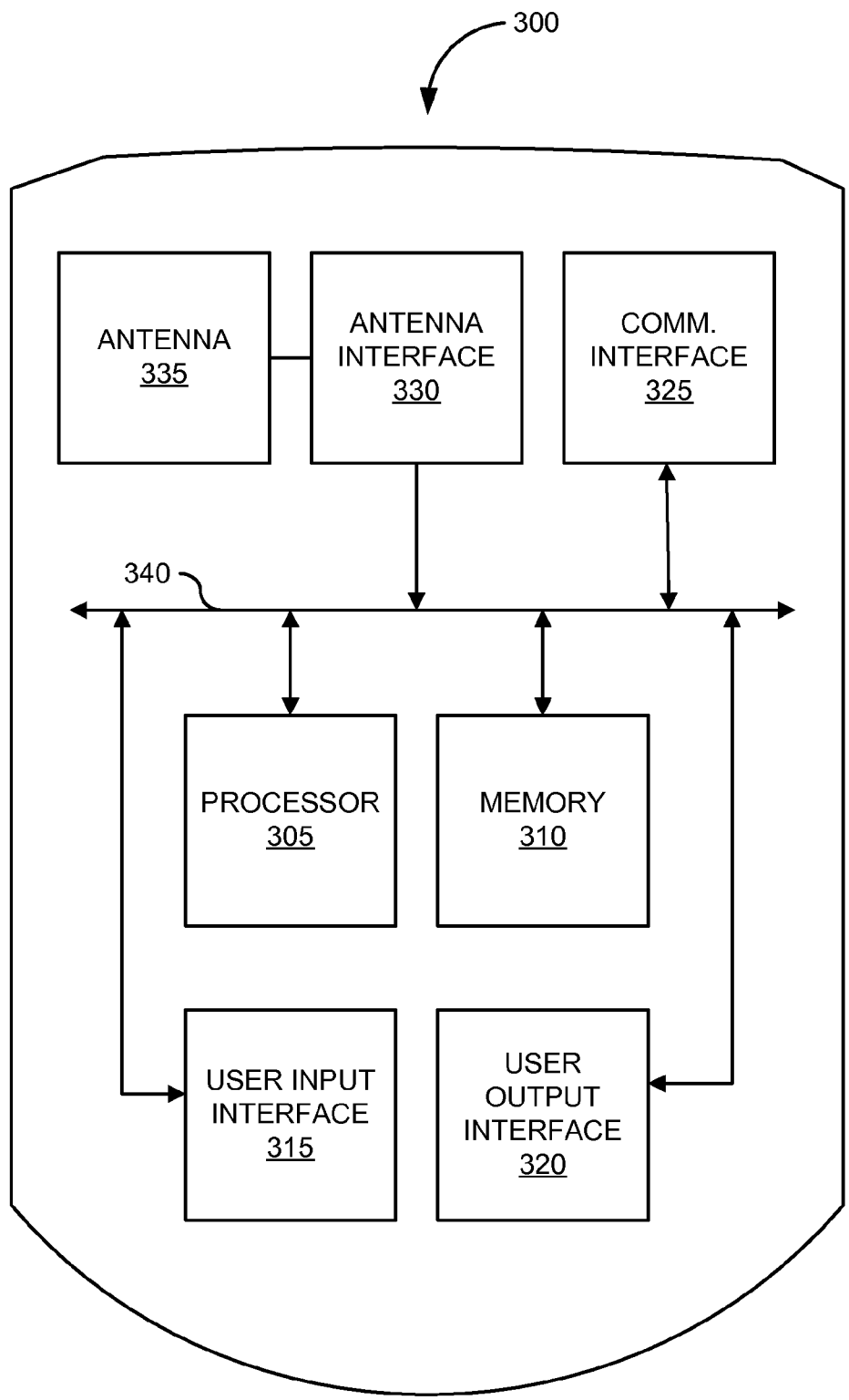
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultrahigh, and microwave frequencies to store and retrieve data from products or devices using RFID tags.

Figure 4:
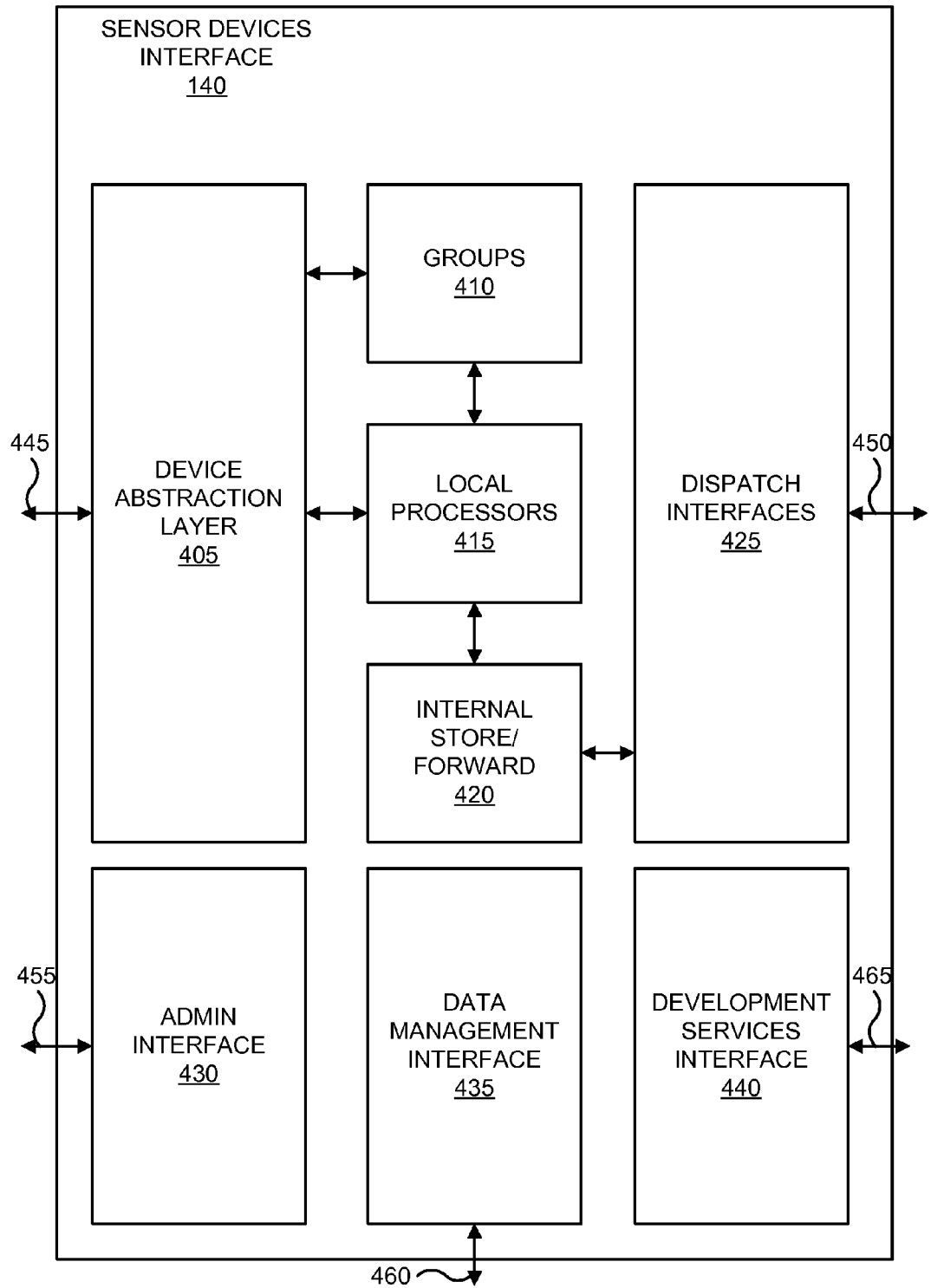
FIG. 4 is a block diagram of a system for interfacing with sensor devices to provide virtualization and quality of data in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Event Processing Finite State Engine

In general, sensor devices 110 generate events. An event is typically an asynchronous message that includes event data. Typically, processing is performed on the events, rather than providing the raw event data to an application. This processing may include transformations and evaluation of event data, and also may require a record or history of state because the messages are asynchronous.

Typically, events may be transformed and mapped (for example, using XSLT) before being used or consumed by applications. However, much of the processing to transform or map events needs to be performed using compiled or scripted code. This leads to some inflexibilities when designing transformations because there may be no common agreements or interfaces between pieces of compiled or scripted code.

Accordingly, in various embodiments, system 100 provides an engine and language that allows a user or administrator to quickly define a finite state machine that can process asynchronous messages received from sensor devices 110. In general, system 100 provides a metadata driven engine that allows, in addition to data transformations, complex functionality, expression computation, decision-making capabilities. Accordingly, system 100 provides a finite state machine and a well-defined context that provides transformations, processing, evaluation, and manipulation of event data.

In general, system 100 implements a metadata-based language that allows a user or administrator to define complex operations and processing on event streams. Thus, system 100 provides an engine to execute the metadata-based language to create a finite state machine that receives and asynchronously processes event data.

Figure 5:
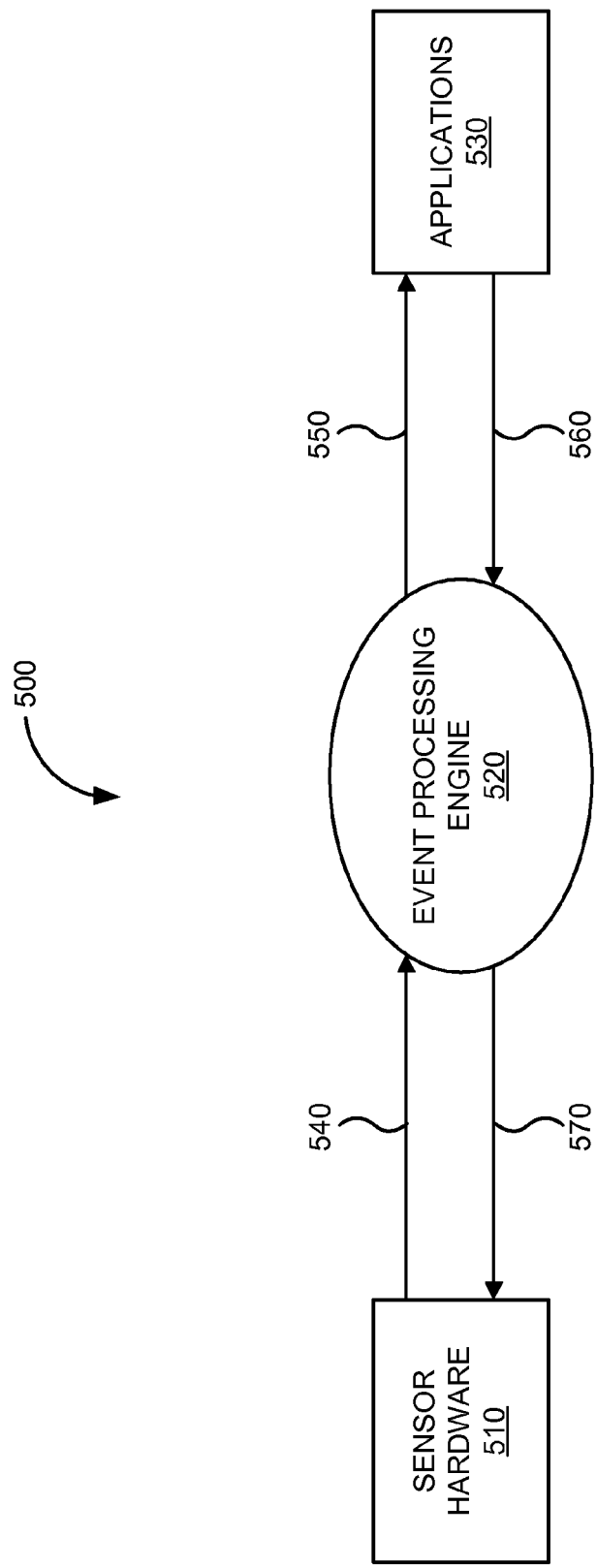
FIG. 5 is a simplified block diagram of system for processing event data in one embodiment according to the present invention.

FIG. 5 is a simplified block diagram of system 500 for processing event data in one embodiment according to the present invention. System 500 includes sensor hardware 510, event processing engine 520, and applications 530. In general, event processing engine 520 receives events from sensor hardware 510 and performs one or more operations are transformations and forwards data to applications 530.

Sensor hardware 510 includes hardware and/or software elements that generate events. An event may be contained in a discreet or a continuous stream of event data. Event processing engine 520 includes hardware and/or software elements for processing event data. One example of event processing engine 520 is sensor devices interface 140 of FIG. 1. However, other components of system 100 may perform event processing.

In one example of operation, sensor hardware 510 sends event data 540 to event processing engine 520. Event processing engine 520 may transform event data 540, or perform any number of other operations/transformations, after which event processing engine 520 sends event data 550 to applications 530.

In order to process event data 540, event processing engine 520 receives a metadata-based language which defines processing components, sets of states, and entry points that are used to build a finite state machine. The event processing engine 520 executes the finite state machine defined by the metadata-based language to asynchronously process event data 540. During the processing of event data 540, event processing engine 520 may call any number of internal or external services to process or manipulate event data 540 as specified by the metadata-based language.

Accordingly, event processing engine 520 may asynchronously process event data 540 using the metadata-based language. This allows a user to define complex operations and processing on event data 540 at runtime using the metadata-based language. Additionally, processing components may be written at any time, and provided as plug-ins using the metadata-based language, such that event processing engine 520 may be expanded without using compiled code.

Furthermore, entry points into the finite state machine defined by the metadata-based language may be also written at any time, and provided as plug-ins. This allows a user to define processing on event data 540 at a particular starting point in the finite state machine or using pre-existing processing components already part of another finite state machine.

Figure 6:
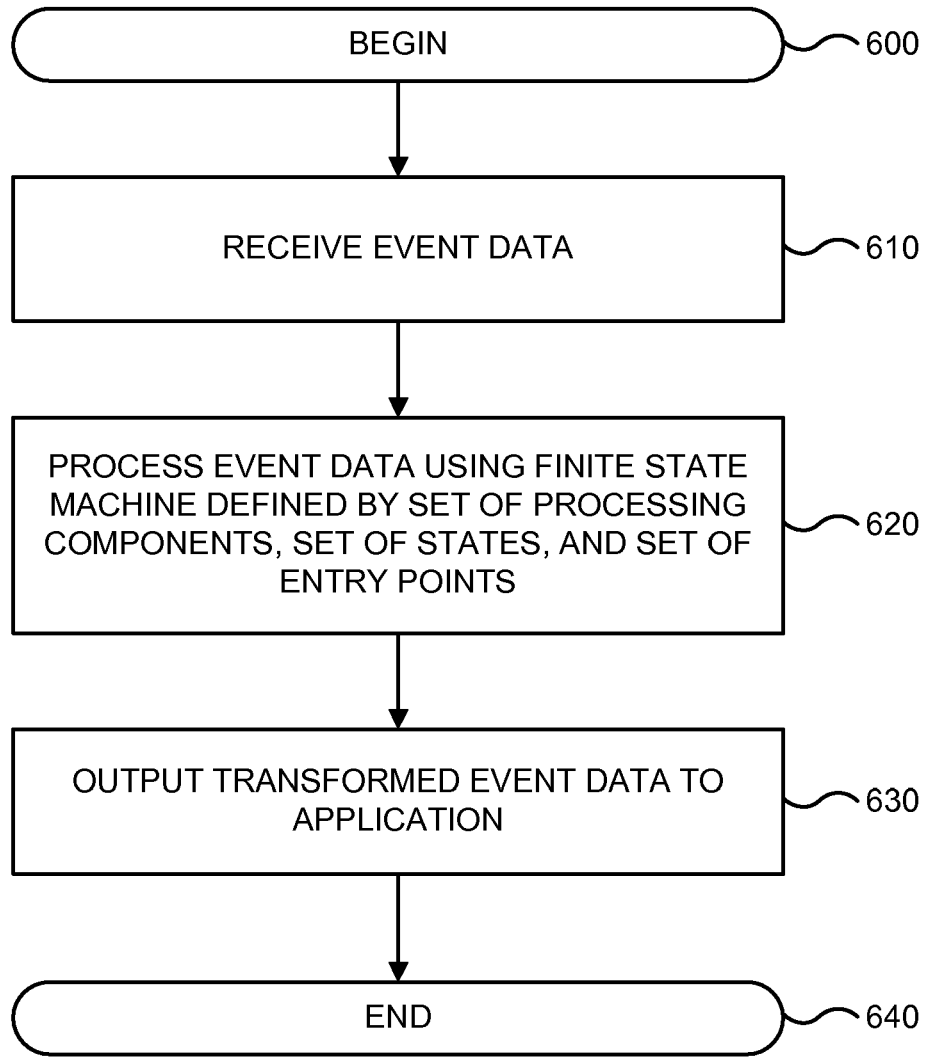
FIG. 6 is a simplified flowchart for processing event data in one embodiment according to the present invention.

FIG. 6 is a simplified flowchart for processing event data in one embodiment according to the present invention. The processing depicted in FIG. 6 may be performed by software modules (e.g., instructions or code) executed by a processor of a computer system, by hardware modules of the computer system, or combinations thereof. In this example, the processing is performed by sensor devices interface 140. Processing may be also performed anywhere in middleware 120 or outside of middleware 120. FIG. 6 begins in step 600.

In step 610, sensor devices interface 140 receives event data. Event data may be received in discreet form, or as a continuous event stream. In step 620, sensor devices interface 140 processes the event data using a finite may state machine defined by a set of processing components, a set of states, and a set of entry points.

In general, a processing component defines one or more operations to be performed on event data. Typically, a processing component receives input in the form of parameters. The parameters define the data on which to operate. The processing component may generate a return value indicating success or failure of the one or more operations.

A state defines one or more processing components, and one or more relationships between one or more processing components. The one or more relationships define transitions to and from the one or more processing components. For example, a "match" state may include a processing component generates a set of results based on a comparison between a first input and a second input. The comparison may be a binary comparison, a text comparison, a numerical comparison, and the like. One or more relationships defined in the "match" state indicate transitions to other states from the match state based on a set of results. The state may also define return values, execution codes, and error exceptions.

An entry point defines one or more states in which to enter processing of the finite state machine based on event data. For example, if a particular attribute of event data is matched by a given entry point, sensor devices interface 140 begins processing of the event data at the state indicated by the given entry point. A finite state machine according to embodiments of the present invention may have more than one entry point.

In step 630, sensor devices interface outputs transformed event data to an application. FIG. 6 ends in step 640.

Accordingly, sensor devices interface 140 may process event data asynchronously using the finite state machine. Based on one or more entry points, sensor devices interface 140 may enter processing according to the finite state machine to transform or otherwise manipulate event data to be output to applications. Thus, in various embodiments, processing components may be written and used by sensor devices interface 140 as plug-ins during runtime. This allows the processing capabilities of sensor devices interface 140 to be expanded at any time simply by adding a new plug-in and a possible entry point, without using compiled or scripted code.

Figure 7:
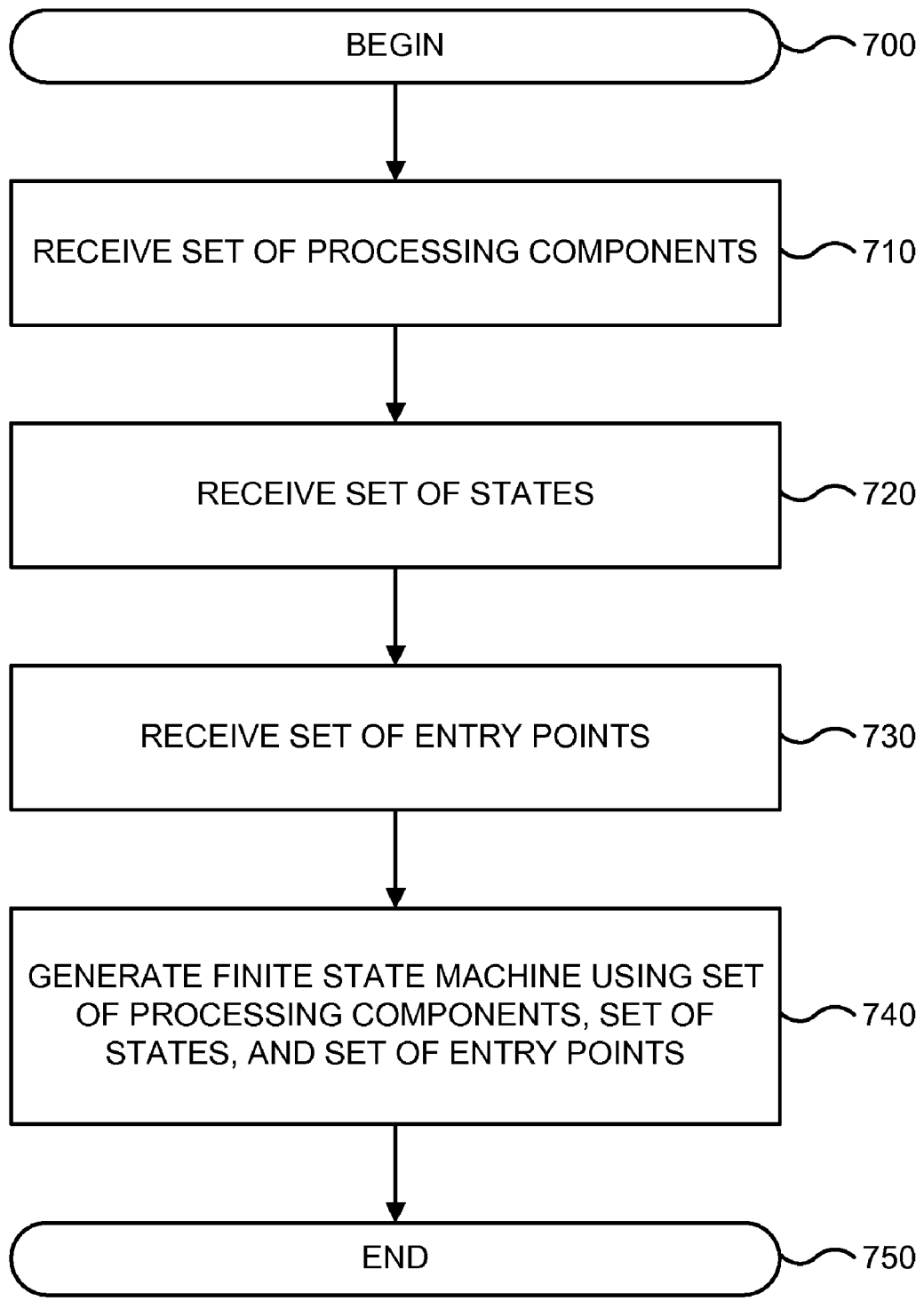
FIG. 7 is a flowchart for generating a finite state machine for processing event data in one embodiment according to the present invention.

FIG. 7 is a flowchart for generating a finite state machine for processing event data in one embodiment according to the present invention. FIG. 7 begins in step 700.

In step 710, sensor devices interface 140 receives a set of processing components. In step 720, sensor devices interface 140 receives a set of states. In step 730, sensor devices interface 140 receives a set of entry points. In step 740, sensor devices interface 140 generates a finite state machine using the set of processing components, the set of states, and the set of entry points.

In various embodiments, sensor devices interface 140 generates a graph representing a state machine from the set of processing components, the set of states, and the set of entry points. Sensor devices interface 140 then uses the graph during asynchronous processing of event data to process the finite state machine represented by the graph. FIG. 7 ends in step 750.

Figure 8:
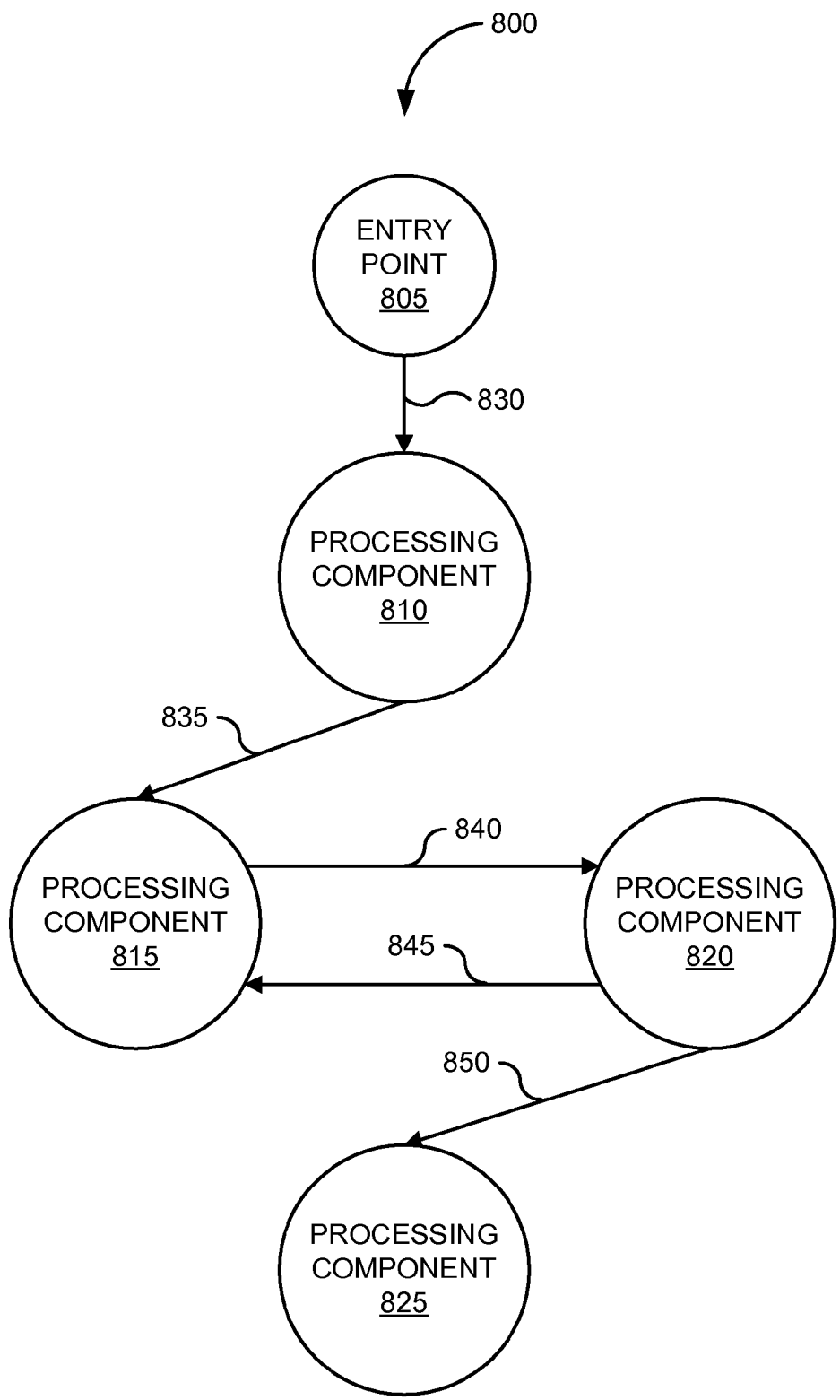
FIG. 8 is a block diagram of a finite state machine in one embodiment according to the present invention.

FIG. 8 is a block diagram of a finite state machine 800 in one embodiment according to the present invention. The finite state machine 800 includes an entry point 805, and processing components 810, 815, 820, and 825. In this example, entry point 805 is linked to processing component 810 by transition 830. Processing component 810 is linked by transition 835 to processing component 815. Processing component 815 is linked by transition 840 to processing component 820. Processing component 820 is linked by transition 845 to processing component 815, and by transition 850 to processing component 825.

In general, sensor devices interface 140 generates a graph representing the finite state machine 800 in response to metadata-based language defining the set of processing components, the set of states, and the set of entry points. In this example, sensor devices interface 140 receives event data, and analyzes the event data for a particular attribute or data set that is specified by entry point 805.

Upon finding the particular attribute or data set specified by entry point 805, sensor devices interface 140 passes the event data to processing component 810 using transition 830. Processing component 810 then performs one or more operations, transformations, evaluations, and the like, on the event data. In response to a successful execution by processing component 810, processing component 810 transitions to processing component 815 using transition 835. Processing component 810 may pass one or more parameters to processing component 815 as a result of processing the event data. The one or more parameters may include the event data as transformed by processing component 810.

Processing component 815 may also perform one or more operations, transformations, evaluations, and the like on the event data or parameters received from processing component 810. Processing component 815 then calls or transitions to processing component 820 using transition 840. Processing component 825 may also then perform one or more operations, transformations, evaluations, and the like, on the event data.

In this example, processing component 820 may transition to processing component 815 using transition 845, or transition to processing upon 825 using transition 850. Processing component 825, may perform one or more operations, transformations, evaluations, and the like, on the event data. If processing component 825 represents the final or accepting state of finite state machine 800, sensor devices interface 140 then may forward be processed event data to one or more applications.

Figure 9:
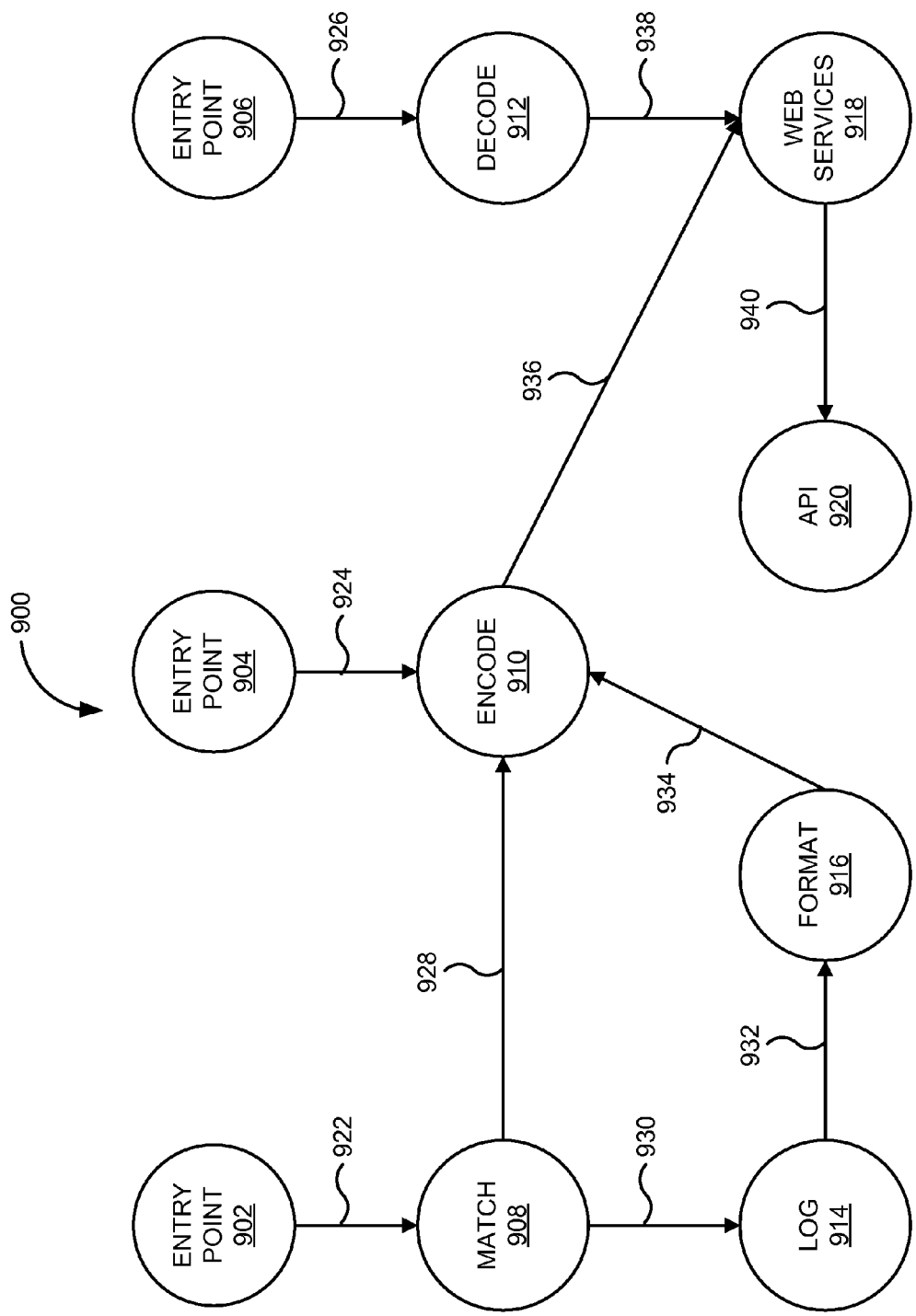
FIG. 9 is a block diagram of a finite state machine having multiple entry points in one embodiment according to the present invention.

FIG. 9 is a block diagram of a finite state machine 900 having multiple entry points in one embodiment according to the present invention. In this example, finite state machine 900 includes entry points 902, 904, and 906, a match state 908, an encode state 910, a decode state 912, a log state 914, a format state 916, a web services state 918, and an API state 920.

Entry point 902 is linked to match state 908 via transition 922. Entry point 904 is linked to encode state 910 via transition 924. Entry point 906 is linked to decode state 912 via transition 926. Match state 908 is linked to encode state 910 via transition 928, and to log state 914 via transition 930. Log state 914 is linked to format state 916 via transition 932. Format state 916 is linked to encode state 910 via transition 934. Encode state 910 is linked to web services state 914 via transition 936. Decode state 912 is linked to web services state 918 via transition 938. Web services state 918 is linked to API state 920 via transition 940.

In this example, sensor devices interface 140 receives event data and monitors or processes the event data for one or more attributes or data sets defined by entry points 902, 904, and 906. Each of the entry points 902, 904, and 906 may specify a different attribute or data set to be monitored by sensor devices interface 140. For example, entry point 902 may direct sensor devices interface 140 to monitor for RFID tags that include a UPC code, while entry point 904 may direct sensor devices interface 140 to monitor for RFID tags that include a GLN code, while entry point 906 may direct sensor devices interface 140 to monitor for RFID tags that include a GTLN code. Thus, sensor devices interface 140 asynchronously processes the event data and enters multiple points of finite state machine 900 using entry points 902, 904, and 906.

Match state 908 provides a processing component that performs one or more types of comparisons or matches on input data. Based on the one or more types of comparisons, match state 908 generates a set of results. Based on the set of results, sensor devices interface 140 either transitions to encode state 910, or transitions to log state 914.

Log state 914 provides a processing component that logs input data to a system log, such as a file or a database. Log state 914 may not transform event data received from match state 908 but merely writes all or portions of the event data to the system log. Log state 914 and transitions to format state 916.

Format state 916 provides a processing component that formats event data according to predetermined criteria. For example, format state 916 may format the event data as plaintext, encapsulate the event data in a markup language (e.g., HTML or XML), convert the event data to different number spaces, and the like. Format state 916 then transitions to encode state 910.

Encode state 910 provides a processing component that encodes event data according to an encoding scheme. For example, encoding state 910 may encrypt or decrypt event data. Encoding state 910 may also convert portions of the event data to different number spaces, characters spaces, and the like. Encoding state 910 may also format the data similar to format state 916. Encoding state 910 transitions to web services state 918.

Alternatively, sensor devices interface 140 may monitor for event data which matches an attribute, field, or data set defined by entry point 904. Sensor devices interface 140 then may initiate processing of the event data at encoding state 910 via transition 924.

In another alternative, sensor devices interface 140 may monitor for event data which matches an attribute, field, portion of event data, or data set defined by entry point 906. Sensor devices interface 140 then may initiate processing of the event data at decode state 912 via transition 926.

Decode state 912 provides a processing component ID codes event data according to a decoding scheme. For example, decoding state 912 may encrypt or decrypt event data, decoding state 912 may also convert portions of the event data to different number spaces, character spaces, and the like. Decode state 912 then transitions to web services state 918 via transition 938.

Web services state 918 provides a processing component that provides web services. For example, web services state 918 may call a web service protocol stack. In general, a web service protocol stack is a collection of computer networking protocols that are used to define, locate, implement, and make web services interact with each other. Typically, a web service protocol stack mainly comprises four areas: service transport, XML messaging, service description, and service discovery.

Service transport is typically responsible for transporting messages between network applications, and includes protocols such as HTTP, SMTP, FTP, and Blocks Extensible Exchange Protocol (BEEP). XML messaging is typically responsible for encoding messages in a common XML format so that the messages can be understood at either end of a network connection. Some examples of protocols used for XML messaging include XML-RPC, SOAP, and REST.

Service description is typically responsible for describing the public interface to a specific web service. One example of a service description is provided by the WSDL interface format. Service discovery is typically responsible for centralizing services into a common registry, such that network web services can publish their location and description, and makes it easy to discover what services are available. One example of a service discovery is provided by the UDDI API. Web service protocol stack may also include a range of defined protocols, such as BPEL and SOAP-DSIG.

In this example, at the return of successful processing, web services state 918 transitions to API state 920 via transition 940. API state 920 includes a processing component that provides an interface to one or more applications for accessing transformed event data. In general, an application programming interface (API) is an interface that a computer system or program library provides in order to support requests for services, such as a coherent interface consisting of several classes or several sets of related functions or procedures. For example, API state 920 may include one or more buffers, filters, or further data transformations that allow applications to access the event data, or to access operations to be further performed on the event data.

Thus, finite state machine 900 may include various types of processing components to perform different operations on event data. According to various embodiments, the processing components may be written as plug-ins, and inserted into processing of event data at real-time. This allows an administrator to implement or updated finite state machines doe real-time asynchronous processing of event data.

FIG. 10 represents one example of a specification 1000 for generating a finite state machine in response to a set of processing components, a set of states, and a set of entry points in one embodiment according to the present invention. In this example, specification 1000 includes a schema definition 1010, a components definition 1020, an entry point definition 1030, and a state definition 1040.

Schema definition 1010 includes one or more statements that define the finite state machine. In this example, the schema definition 1010 is written in the Extensible Markup Language (XML). Other markup languages, scripted or complied languages may be used to generate the one or more statements that define the finite state machine.

Components definition 1020 includes one or more statements that define at least one processing component. In this example, components definition 1020 includes a "Match Event" processing component 1050. Processing component 1050 (e.g., expressed as <component name="matchEvent" class="\\class_path\.MatchEventState"/>) includes a namespace and a class variable. The namespace is used by one or more states to reference processing component 1050. The class variable, in this example, provides a pointer or URL to a set of functions or procedures (e.g., a JAVA class or other API interface).

Entry point definition 1030 includes one or more statements that define at least one entry point. In this example, entry point definition 1030 includes an entry point 1060. Entry point 1060 (e.g., expressed as <onEvent state='A.check'/>) includes a pointer or reference to one or more states (e.g., state A.check).

State definition 1040 includes one or more statements that define at least one state. In this example, state definition 1040 includes a state 1070. State 1070 (e.g., expressed as:

```
<matchEvent name="A.check" control="matchEvent"
    type="200" x="100" y="200">
        <case result="ok" next="rfid.event"/>
</matchEvent>
``` includes a namespace (e.g., A.check), a control that identifies one or more processing components to be employed after entering the state, and a set of results statements 1080. The set of results statements 1080 define one or more transitions from the state to other states. For example, if an "ok" results is received from the "matchevent" processing component, then the A.check state transitions to a state called "rfid.event."

The following is an expanded view of specification 1000. The following is merely one example, and is not intended to be limiting in any manner.

```
<eflow>
<!--
In general, a dispatcher (e.g., sensor devices interface 140) cycles through states that
are described in this xml file. This xml file describes a state machine and the
conditions under states transition from one state to the next. The states are initialized
from the first section (described next). And then the conditions to enter and leave
each state are described further down in this file. Note, throughout this document,
there will be references to a Context class. This class is \\class_path\.Context. Its a
very simple class which basically provides hashtable type lookup into the various
event and server related fields. These are the fields defined (most of them are self
explanatory):
    server.name
    server.siteName
    server.time
    server.isoTime
    dispatcher.name
    dispatcher.description
    dispatcher.version
    event.type
    event.subType
    event.id - list of concatenated ids separated by ','
    event.data - list of concatenated data fields separated by ','
    event.time
    event.siteName
    event.deviceName
    event.correlationId
    event.sourceName
```

And there are two non-standard ones:

```
event.idCount - the number of separate ids in this event (before id)
event.id[i] - this is set for every id where i is from 0 to event.idCount
event.data[i] - this is set for every data where i is from 0 to event.idCount
```

These fields are always set for each incoming event to the eflow dispatcher. There are also system parameters that can be defined by the user (using the addContext state handler). These system parameters are held statically in the Context object in a separate hashtable. For more information, please read the section on the addContext state handler. The first section is the <components>. This section contains a list of what essentially amounts to all the different actions or state handlers that can be loaded at initialization time. Each one has a name and the class that extends the abstract base class:
    \\class_path\.State
The name attribute under each component element refers to how the eflow dispatcher will identify that particular state.

```
-->
<components>
    <component name="addContext" class="\\class_path\.impl.AddContextState"/>
    <component name="callBean" class="\\class_path\.impl.CallBeanState"/>
    <component name="dbproc" class="\\class_path\.impl.DbProcState"/>
    <component name="fireTrigger" class="\\class_path\.impl.FireTriggerState"/>
    <component name="matchEvent" class="\\class_path\.impl.MatchEventState"/>
    <component name="post" class="\\class_path\.impl.PostState"/>
    <component name="sendEvent" class="\\class_path\.impl.SendEventState"/>
    <component name="template" class="\\class_path\.impl.TemplateState"/>
    <component name="transport" class="\\class_path\.impl.TransportState"/>
    <component name="callWs" class="\\class_path\.impl.WsState"/>
    <component name="onsLookup" class="\\class_path\.impl.OnsLookupState"/>
    <component name="decodeTag" class="\\class_path\.impl.DecodeState"/>
    <component name="encodeTag" class="\\class_path\.impl.EncodeState"/>
    <component name="isCapture" class="\\class_path\.impl.IsCaptureState"/>
    <component name="isQuery" class="\\class_path\.impl.IsSimpleQueryState"/>
</components>
<!--
```

The entry element tells eflow dispatcher which state to enter into first when a new event comes in to be dispatched. As of now there is only one type of entry point which is the <onEvent> entry point. It has one attribute which points to which state to start the event flow with.

```
-->
<entry>
    <onEvent state='A.check'/>
</entry>
<!--
```

The <states> element contains a list of all the valid states, In this section, each state will be documented. When the eflow dispatcher calls on a state handler to handle an event, it hands off control of the event to this particular state handler. In this particular example, the first state handler to be run will be the state handler with the attribute "name" equal to A. check. This is defined above in the onEvent entry point. So when the event comes into the eflow dispatcher, it will search for a state named 'A.check' (which in this case is a matchEvent state), and then hand the event over to the process method (declared abstract in the \\class_path\.State class). This method has to return a String which identifies what state the eflow dispatcher should transition to next.

In this particular setup, the matchEvent handler can return several different strings, one is which is 'ok'. If this is returned by the matchEvent handler, then the eflow dispatcher will identify the next state by looking at the <case> elements within the state. In this case, the <case> element has to have a result of 'ok' to move onto the next state. In this example, this next state is named "rfid.event". Which as we can see is the next state, also a matchEvent state handler. Now, each of the handlers above will be documented within this <states> section.

```
-->
<states>
<!--
```

This matches events to the values defined in the attributes of the <matchEvent> element. All of the listed attributes have to match the fields of the incoming event. If they pass all the conditions, the state returns "ok", otherwise it returns "notFound". This is a list of all the possible attributes and what they control:

'matchEvent' is currently the only acceptable value.
The following attributes refer to matching the various fields of the event to be matched. If a value is given for any the event fields then those fields have to match the fields of the incoming event to result in:
    type
    subtype
    id
    data
There are two final attributes that don't map directly to the event structure:
    idsAny: This is a comma separated list of ids. If the incoming id of the event matches any id in this list, the condition will be satisfied.
    idsAll: This is a comma separated list of ids. The incoming ids of the event must match all of the ids listed in this list for the condition to be satisfied.

```
-->
<matchEvent name="A.check" control="matchEvent" type="200" x="100" y="200">
    <case result="ok" next="rfid.event"/>
</matchEvent>
<matchEvent name="rfid.event" control="matchEvent" type="200"
    id="000000000001" x="100" y="200">
    <case result="ok" next="callbean.event"/>
    <case result="notFound" next="bad.event"/>
</matchEvent>
<!--
```

The callbean handler will call a method in a class with the event. Through reflection, the handler will load the class defined in the "class" attribute, and then load the method defined by the "methodName" attribute. The method should have the signature:

public void methodName(java.lang.String, \\class_path\.Context)

Context is the class that holds all the field values of the event to be dispatched. The String is the userdata supplied as an attribute below. If the function returns without any errors, then the handler returns "ok". If there are errors, the handler returns "error".

```
-->
<callBean name="callbean.event" class="mypackage.myclass"
    methodName="onEvent" userData="myuserdata">
    <case result="ok" next="dbproc.event"/>
    <case result="error" next="bad.event"/>
</callBean>
<!--
```

The database procedure handler actually calls an pl/sql in the database. (Note the x and y attributes are not used yet and are a placeholder for a future gui.) The three attributes in the <dbproc> element refer to the following:

jndi—this is the jdni name that will be used to look up the connection it should be preconfigured through the EM console method—this is the method name that will be called through jdbc dbcallback—this is used to do further processing on returned values.

If an xml file is listed there, the state handler will try to load this file from the config dir (Where eflow.xml is located) and then try to parse it.

Underneath the <dbproc> element, each parameter which is an argument into the database callback is defined. The name defines which parameter order in which the method will be called. And then there are several datatypes that can be argument types:

clob, string, date, int, io to the database method.

'io' refers to input/output to the method. In other words, it can be used to return values to the state handler.

For clob, string, date, date, and int, the valid inputs are:

event.<field name> - where fieldname matches the fieldnames in the Context object described at the top of this file.
number(<an integer>) - where this will set the value of this argument to the callback to be the integer listed between the parens.

For io, any value can be listed. This is just a name to identify the returned value with. This can be used further inside of the dbcallback functionality. If the procedure returns successfully with no errors, then the state handler returns "ok", if there is an exception, the state handler returns "error."

```
-->
<dbproc name="dbproc.event" x="100" y="200" method="mypackage.myprocedure"
        jndi="dbconn" dbcallback="eflow-instructions.xml">
    <param name="param1.clob">event.id</param>
    <param name="param2.clob">event.data</param>
    <param name="param3.string">event.devicename</param>
    <param name="param4.date">event.date</param>
    <param name="param5.string">event.sitename</param>
    <param name="param6.int">number(0)</param>
    <param name="param7.int">number(0)</param>
    <param name="param8.int">number(0)</param>
    <param name="param9.int">number(0)</param>
    <param name="param10.int">number(0)</param>
    <param name="param11.io">ret_val</param>
    <param name="param12.io">ret_msg</param>
    <case result="ok" next="decode.event"/>
    <case result="error" next="bad.event"/>
</dbproc>
<!--
```

This state handler will instruct the SyncReadCycle Controller to fire a trigger that has the name defined in the 'triggerName' attribute. In this case, it will instruct the SyncReadCycle controller to fire a trigger by the name 'triggername'. If the call to the SyncReadCycle controller returns successfully with no errors, then the state handler returns "ok", if there is an exception, the state handler returns "error."

```
-->
<fireTrigger name="firetrigger.event" triggerName="triggername">
    <case result="ok" next="addcontext.event"/>
    <case result="error" next="bad.event"/>
</fireTrigger>
<!--
```

The addContext state handler can be used to inject additional contextual information into the Context object passed into its process () method. If the isPersist attribute is set to 'true', then the addContext handler will put these values into the permanent area of the Context object. Then any other handler can access these values. If set to false, it will only be visible to other state handlers for this particular event being dispatched and then it will no longer be available when the next event goes to be dispatched. In the below example, a key named 'param1', will be put into the Context object with the string value 'The value of param 1'. Since the is Persistent attribute is set to true, this will remain in the Context memory for the lifetime of the eflow dispatcher. Unless there is some unlikely runtime exception such as out of memory or otherwise, this will always return "ok".

```
-->
<addContext name="addcontext.event" isPersistent="true">
    <param name="param1">The value of param 1</param>
    <param name="param2">The value of param 2</param>
    <case result="ok" next="post.event"/>
    <case result="error" next="bad.event"/>
</addContext>
<!--
```

The post state handler essentially posts everything in the Context object to a http server. Then if a later state handler is interested in the response from the object, this handler can put that into the context object for later use by a diff state handler. The "URL" attribute is where the http server is located. If doPost is set to true, then the post handler does the following:

1) It will look up a value from the Context object using (as a key) the valuedefined in the "src" attribute. In this case, it does a context.getParam("srcvalue");

2) If this value is null, the handler will throw an error.

3) If not null, once a url has been constucted, and an http connection opened, the post handler will actually write out the param retrieved on step #1

4) Whatever value is returned by the http server in the http response, the post handler will set it in the Context object using the key "post.result".

5) This return value is not available for future state handlers.

The url that is used to open an http connection is in the following form:

http://<url>?(&) contextkey=contexttval

Where contextkey is one of the keys in the Context object, and the contextval is the corresponding value. Then an '&'is appended and this repeats until all of the keys in the Context object are enumerated with their corresponding values. This list is at the top of this file where we discuss what the Context object looks like. If the procedure returns successfully with no errors, then the state handler returns "ok", if there is an exception, the state handler returns "error."

```
-->
<post name="post.event" url="http://someserver.com/target"
    doPost="true"
    proxy="http://myproxy.com" proxyPort="80"
    src="srcvalue">
    <case result="ok" next="template.event"/>
    <case result="error" next="bad.event"/>
</post>
<!--
```

The template state handler just goes through a file and does token replacement. Once the replacement is done, this entire new file is placed in a String and put into the Context using a key name set by the "dest" attribute. In this example it would be "mykey". The location of the file to be loaded is in the "file" attribute. The format of the file is simple. Every token to be replaced should be surrounding by '$'. Any token surrounding by '$' will be looked up in the Context object using the token as a key for the value. If the procedure returns successfully with no errors, then the state handler returns "ok", if there is an exception, the state handler returns "error."

```
-->
<template name="template.event" file="/home/myuser/template.file"
    dest="mykey">
    <case result="ok" next="transport.event"/>
    <case result="error" next="bad.event"/>
</template>
<!--
```

The transport state handler is very similar to post handler. The keyname is used to retrieve a parameter from the Context object. This is written to the uri defined in the "uri" attribute (loaded by the transport library). After this value is written, all the bytes returned by the connection defined by the uri are stored in a byte buffer, then written as a string into the Context object using the key "post.result". If the procedure returns successfully with no errors, then the state handler returns "ok".

```
-->
<transport name="transport.event" src="keyname" uri="connection uri">
    <case result="ok" next="callWs.event"/>
    <case result="error" next="bad.evemt"/>
</transport>
<!--
```

The call Ws State handler basically calls a custom webservice. The wsdl end point and method name to be called are define as attributes of the <callWs> element. The method name defaults to "edgeClientCallBack" if not defined. Then each parameter to be used in the call to the endpoint is defined. The name of the parameter is in the "name" attribute of each <param> element. The type is described in the "type" attribute. If no type is specified it defaults to string. Finally the value is defined as the text child of the <param> element. Once again like some of the previous handlers, there is a substitution done on the value of the call to the web service by looking it up in the Context object. Please look at a more extension description in one of the previous handlers. If the procedure returns successfully with no errors, then the state handler returns "ok", if there is an exception, the state handler returns "error."

```
-->
<callWs name="callWs.event" wsdl="uri of wsdl endpoing"
    method="ws method name">
    <param name="devicename" type="string">MyDevice</param>
    <param name="type" type="string">$event.type$</param>
    <param name="subtype" type="int">$event.subtype$</param>
    <param name="id" type="int">$event.id$</param>
    <case result="ok" next="undefined"/>
    <case result="error" next="bad.evemt"/>
</callWs>
<!--
```

Figure 11:
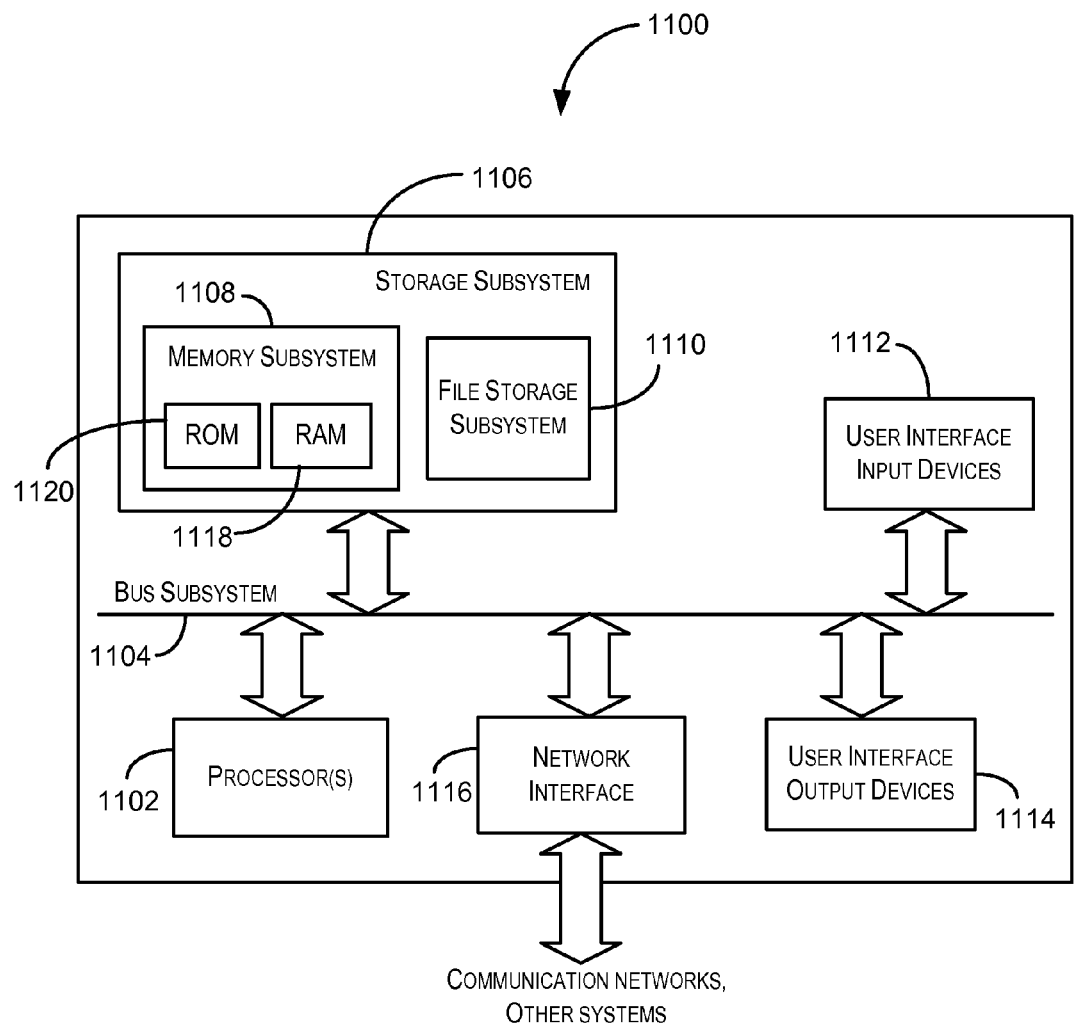
FIG. 11 is a simplified block diagram of a computer system that may be used to practice embodiments of the present invention.

The sendEvent state handler actually can send off multiple events. If the toDispatcher attribute is set to true, then it will send it to the dispatcher, otherwise, put it in the instruction queue. There can be multiple events, each one encased in the <Event> element. Each event can have multiple id/data fields. To describe each one there should be an <item> element, the id is set as an attribute of this element, and the value is set as everything underneath the item element. To take a value from the Context and substitute it, you do a substitution. Place the key (as in the <to> element beneath) of the value in the Context you wish to use as a substitution, and surround it with '$'. The list of keys is at the top of this file where we discuss the Context object. If the procedure returns successfully with no errors, then the state handler returns "ok", if there is an exception, the state handler returns "error."

invention. As shown in FIG. 11, computer system 1100 includes a processor 1102 that communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116.

```
-->
<sendEvent name="bad.event" toDispatcher="true">
    <Event>
        <siteName>MySite</siteName>
        <correlationId>Correlationid</correlationId>
        <from>mysourcename</from> <!-- This sets the sourcename in the
        event -->
        <to>$event.deviceName$</to> <!-- This sets the devicename in the
        event -->
        <type>$event.type$</type>
        <subType>$event.subType$</subType>
        <createTime>1143506033794</createTime>
        <item id="id1">data 1</item>
        <item id="id2">
        <i>abc</i>
        </item>
        <item id="idn">data n</item>
    </Event>
    <!-- There can be multiple events. events can be repeated -->
    <Event>
        <siteName>MySite</siteName>
        <correlationId>Correlationid</correlationId>
        <from>mysourcename</from> <!-- This sets the sourcename in the
        event -->
        <to>$event.deviceName$</to> <!-- This sets the devicename in the
        event -->
        <type>$event.type$</type>
        <subType>$event.subType$</subType>
        <createTime>1143506033794</createTime>
        <item id="id1">data 1</item>
        <item id="idn">data n</item>
    </Event>
    <!-- Note here that we do not define what happens if this state returns 'ok'. If
    the eflow state machine does not receive an a return value from a state that
    matches one of these cases, then it just exits out and waits for the next event.
    IF this is the case, the event gets committed in the underlying file queue. IF in
    the case of an error you wish to rollback the event and try to process it again,
    we move to the next state as defined below called 'rollback'. -->
    <case result="error" next="rollback.event"/>
</sendEvent>
<!--
The rollback state is a special state. It does not have to be defined in the class
definitions at the beginning of this file which refer to all the classes of all the diff
states. Its part of the core eflow engine. If the eflow state machine enters this state,
then all further processing is cancelled and the event currently being dispatched by the
eflow dispatcher will be rollbacked and then tried again from the file queue.
-->
<rollback name="rollback.event" >
    <case result="ok" next="undefined"/>
    <case result="error" next="bad.evemt"/>
</ rollback>
</states>
</eflow>
```

As described above, system 100 provides an engine and a metadata-based language that can implement finite state machines for asynchronously processing event data in realtime. This allows new transformations, evaluations, and processing of event data received from sensor devices to be quickly and rapidly implemented using a plug-in architecture. Using system 100, a user can rapidly define complex operations and processing on event streams. Furthermore, using system 100, the user can further defined entry points into processing of event data using the finite state machines.

FIG. 11 is a simplified block diagram of a computer system 1100 that may be used to practice embodiments of the present Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, and networks, and devices. Network interface subsystem 1116 serves as an interface for receiving data from and transmitting data to other systems from computer system 1100.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 may be configured to store the basic programming and data constructs that provide the functionality of the present invention. Software (code modules or instructions) that provides the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1100 can be of various types including a personal computer, a portable computer, a workstation, a network computer, a mainframe, a kiosk, or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method for processing event streams generated by Radio Frequency Identification (RFID) sensor hardware, the method comprising:
   receiving, at one or more computer systems in communication with the RFID sensor hardware, metadata defining a finite state machine configured to detect events in the event streams generated by the RFID sensor hardware, the metadata identifying a set of processing components, a set of states, and a set of entry points into the event streams generated by the RFID sensor hardware;
   configuring, with one or more processors associated with the one or more computer systems, an event processing engine hosted by the one or more computer systems based on the metadata to process the event streams generated by the RFID sensor hardware;
   receiving, at the one or more computer systems, event data associated with an event stream generated by the RFID sensor hardware;
   processing, with the one or more processors associated with the one or more computer systems, the event data according to the finite state machine defined by the metadata to generate an event;
   and storing the event in a database such that the event is accessible to one or more applications.

2. The method of claim 1 further comprising:
   receiving, at the one or more computer systems, information specifying the set of processing components, wherein each of the processing components comprises one or more operations performed by the event processing engine or another identified application on event data associated with the event streams generated by the RFID sensor hardware.

3. The method of claim 2 wherein the one or more operations performed by the event processing engine or another identified application on event data associated with the event streams generated by the RFID sensor hardware comprise at least one of a logical operation, an arithmetic operation, a binary operation, and a compare operation.

4. The method of claim 1 further comprising:
   receiving, at the one or more computer systems, information specifying the set of states, wherein each of states identifies one or more relationships between a first processing component and a second processing component.

5. The method of claim 1 further comprising:
   receiving, at the one or more computer systems, information specifying the set of entry points into the event streams generated by the RFID sensor hardware, wherein each entry point identifies one or more states as start states associated with the finite state machine.

6. The method of claim 1 further comprising:
   generating, with the one or more processors associated with the one or more computer system, the finite state machine based on the set of processing components, the set of states, and the set of entry points.

7. A system for processing event streams generated by Radio Frequency Identification (RFID) sensor hardware, the system comprising:
   a processor;
   and a memory coupled to the processor, the memory configured to store a plurality of code modules which when executed by the processor cause the processor to:
   receive metadata defining a finite state machine configured to detect events in the event streams generated by the RFID sensor hardware, the metadata identifying a set of processing components, a set of states, and a set of entry points into the event streams generated by the RFID sensor hardware;

configuring an event processing engine based on the metadata to process the event streams generated by the RFID sensor hardware;

receive event data associated with an event stream generated by the RFID sensor hardware;

process the event data according to the finite state machine defined by the metadata to generate an event;

and storing the event in a database such that the event is accessible to one or more applications.

8. The system of claim 7 wherein the processor is configured to:

receive information specifying the set of processing components, wherein each of the processing components comprises one or more operations performed by the event processing engine or another identified application on event data associated with the event streams generated by the RFID sensor hardware.

9. The system of claim 8 wherein the one or more operations performed by the event processing engine or another identified application on event data associated with the event streams generated by the RFID sensor hardware comprise at least one of a logical operation, an arithmetic operation, a binary operation, and a compare operation.

10. The system of claim 7 wherein the processor is configured to:

receive information specifying the set of states, wherein each of the states identifies one or more relationships between a first processing component and a second processing component.

11. The system of claim 7 wherein the processor is configured to:

receive information specifying the set of entry points into the event streams generated by the RFID sensor hardware, wherein each entry point identifies one or more states as start states associated with the finite state machine.

12. The system of claim 7 wherein the processor is configured to:

generate the finite state machine based on the set of processing components, the set of states, and the set of entry points.

13. A computer program product stored on a non-transitory computer readable medium and executable by one or more processors associated with one or more computer systems for processing event streams generated by Radio Frequency Identification (RFID) sensor hardware, the computer program product comprising:

code for receiving metadata defining a finite state machine configured to detect events in the event streams generated by the RFID sensor hardware, the metadata identifying a set of processing components, a set of states, and a set of entry points into the event streams generated by the RFID sensor hardware;

code for configuring an event processing engine based on the metadata to process the event streams generated by the RFID sensor hardware;

code for receiving event data associated with an event stream generated by the RFID sensor hardware;

code for processing the event data according to the finite state machine defined by the metadata to generate an event;

and code for storing the event in a database such that the event is accessible to one or more applications.

14. The computer program product of claim 13 further comprising:

code for receiving information specifying the set of processing components, wherein each of the processing components comprises one or more operations performed by the event processing engine or another identified application on event data associated with the event streams generated by the RFID sensor hardware.

15. The computer program product of claim 14 wherein the one or more operations performed by the event processing engine or another identified application on event data associated with the event streams generated by the RFID sensor hardware comprise at least one of a logical operation, an arithmetic operation, a binary operation, and a compare operation.

16. The computer program product of claim 13 further comprising:

code for receiving information specifying the set of states, wherein each of the states identifies one or more relationships between a first processing component and a second processing component.

17. The computer program product of claim 13 further comprising:

code for receiving information specifying the set of entry points into the event streams generated by the RFID sensor hardware, wherein each entry point identifies one or more states as start states associated with the finite state machine.

18. The computer program product of claim 13 further comprising:

code for generating the finite state machine based on the set of processing components, the set of states, and the set of entry points.

* * * * *

UNITED STATES PATENT AND TRADEMARK OFFICE
CERTIFICATE OF CORRECTION

| | | |
|---|---|---|
| PATENT NO. | : 8,099,737 B2 | Page 1 of 2 |
| APPLICATION NO. | : 11/758527 | |
| DATED | : January 17, 2012 | |
| INVENTOR(S) | : Rehman | |

It is certified that error appears in the above-identified patent and that said Letters Patent is hereby corrected as shown below:

On front page, in column 2, under "Abstract", line 5, after "data" delete "is".

In column 14, line 61, delete "<components>." and insert -- <components> sections. --, therefor.

In column 15, line 34, delete "states," and insert -- states. --, therefor.

In column 15, line 39, delete "A. check." and insert -- A.check. --, therefor.

In column 15, line 48, delete "one is" and insert -- one of --, therefor.

In column 16, line 52, delete "ids of" and insert -- ids in --, therefor.

In column 17, line 44, delete "pl/sql" and insert -- pl/sql function --, therefor.

In column 17, line 48, delete "jdni" and insert -- jndi --, therefor.

In column 18, line 1, after "date," delete "date,".

In column 18, line 34, delete "Controller" and insert -- controller --, therefor.

In column 18, line 54, delete "process ()" and insert -- process() --, therefor.

In column 18, line 54, delete "isPersist" and insert -- isPersistent --, therefor.

In column 18, line 63, delete "value" and insert -- value. --, therefor.

In column 18, line 63, delete "param 1'." and insert -- param1'. --, therefor.

In column 19, line 25, delete "constucted" and insert -- constructed --, therefor.

In column 19, line 27, delete "on step #1" and insert -- in step #1. --, therefor.

In column 19, line 37, delete "contexttval" and insert -- contextval --, therefor.

In column 19, line 65, delete "surrounding" and insert -- surrounded --, therefor.

In column 19, line 66-65, delete "surrounding" and insert -- surrounded --, therefor.

In column 20, line 27, delete "evemt" and insert -- event --, therefor.

In column 20, line 31, delete "call Ws" and insert -- callWs --, therefor.

In column 20, line 33, delete "define" and insert -- defined --, therefor.

In column 20, line 43, delete "extension" and insert -- extensive --, therefor.

Signed and Sealed this
Third Day of April, 2012

David J. Kappos
*Director of the United States Patent and Trademark Office*

CERTIFICATE OF CORRECTION (continued)
U.S. Pat. No. 8,099,737 B2

In column 20, line 51, delete "endpoing" and insert -- endpoint --, therefor.

In column 20, line 56, delete "evemt" and insert -- event --, therefor.

In column 21, line 34, delete "an a" and insert -- a --, therefor.

In column 21, line 50, delete "evemt" and insert -- event --, therefor.